Apr. 17, 1923.                    1,451,720
                C. J. SWANK
              EXTERMINATOR TRAP
             Filed Nov. 2, 1922
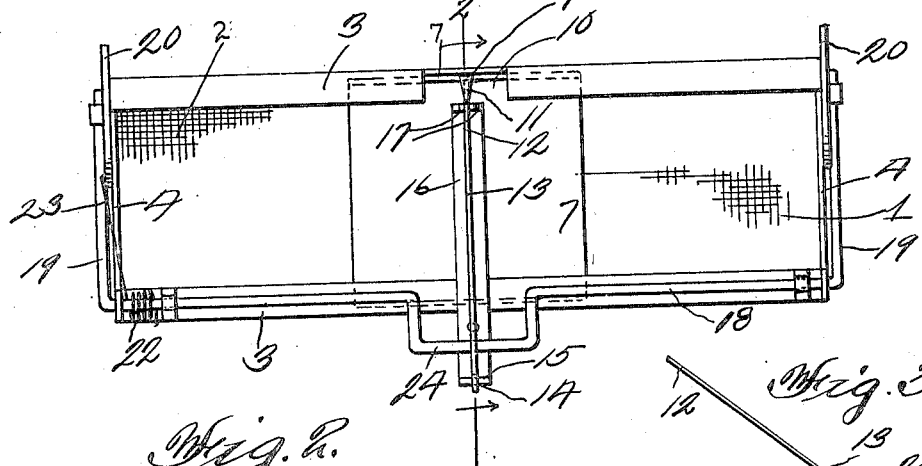
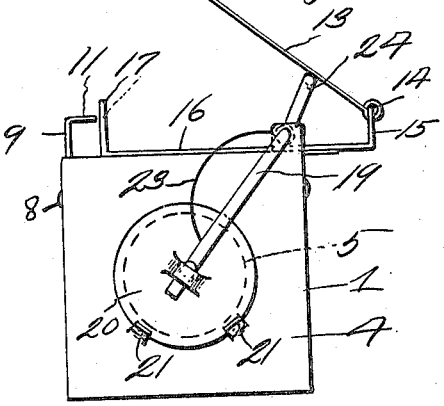
Inventor
C. J. Swank
By D. Swift
Attorney Patented Apr. 17, 1923.

1,451,720

UNITED STATES PATENT OFFICE.

CHRISTIAN J. SWANK, OF TOPEKA, KANSAS.

EXTERMINATOR TRAP.

Application filed November 2, 1922. Serial No. 598,529.

*To all whom it may concern:*

Be it known that I, CHRISTIAN J. SWANK, a citizen of the United States, residing at Topeka, in the county of Shawnee and State of Kansas, have invented a new and useful Exterminator Trap; and I do hereby declare the following to be a full, clear, and exact description of the invention, such as will enable others skilled in the art to which it appertains to make and use the same.

The invention relates to traps, particularly traps of the mouse or rat type, and has for its object to provide a device of this character comprising an elongated casing having a rockable shaft adjacent one of the sides of the casing, said shaft being provided with arms overlying the ends of the casing and having closure members thereon adapted to register with entrance passages in the end of the casing. The shaft is provided with a bail which bail is held against the action of springs when the trap is set and released when the trap is actuated by a mouse. The bail is held in operative position by a pivoted arm, which arm extends over the bail and transversely of the casing and is held by a lug carried by a pivoted platform within the casing, said platform being disposed at a right angle to the arm and movable in a plane at a right angle to the arm.

A further object is to provide guide fingers for the transversely disposed releasing member whereby said member may be guided to substantially an accurate position for underlying the lug carried by the pivoted platform when said platform is in normal position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the trap, showing the same set forth ready to use.

Figure 2 is a vertical transverse sectional view through the trap taken on line 2—2 of Figure 1.

Figure 3 is an end view of the trap showing the same in closed position.

Figure 4 is a perspective view of a portion of the pivoted platform, the releasing rod and the releasing rod guide member.

Referring to the drawing the numeral 1 designates the elongated rectangular shaped body of the trap and 2 the top thereof which is preferably formed from wire mesh secured to flanges 3. The ends 4 of the casing 1 are provided with entrances 5 through which a mouse or rat passes to the chamber 6 of the body member. Disposed within the chamber 6 is a tiltable platform 7 which platform is pivotally mounted on a transversely disposed shaft 8 and is provided with an upwardly extending arm 9 which extends upwardly through the elongated slot 10 in the top 2 of the device. The upper end of the upwardly extending arm 9 is provided with an inwardly extending horizontally disposed lug 11, which lug is adapted to overlie the free end 12 of the pivoted arm 13 which extends transversely across the top of the trap and is pivotally connected at 14 to a bracket 15. Bracket 15 is carried by a transversely disposed plate 16 which extends across the top 2 of the device and terminates in spaced upwardly extending guide fingers 17 between which the free end 12 of the member 13 is guided in its upward movement after a rat has tilted the platform 7 and moved the lug 11 out of engagement with the upper side of the free end 12 of the member 13, thereby insuring a positive operation and release of the pivoted member 13.

Pivotally mounted on one of the flanges 3 of the top 2 adjacent one of the sides of the body 1 is a rockable shaft 18, the ends of which shaft are provided with angularly disposed arms 19 which overlie the ends of the body 1, and are provided with closures 20, which closures are adapted to be moved into and out of registration with the entrances 5 and limited in their downward movement by engagement with struckout lugs 21 carried by the ends 4 adjacent the lower sides of the opening 5. Disposed on the shaft 18 is a coiled spring 22, which spring has one of its arms 23 in engagement with one of the arms 19 of the shaft and its other arm in engagement with the upper side of one of the flanges 3 of the top. Spring 22 forms means for normally forcing the arms 19 downwardly and the closures 20 in the direction of the entrances 5. Disposed centrally of the shaft 18 is a crank 24, which crank is engaged by the pivoted member 13 and held in down position as shown in Figure 2 against the action of the coiled spring 22 by said member 13, thereby holding the trap in set position as shown in Figure 2 and ready to be actuated by the weight of a rat or mouse on either side of the tiltable platform.

From the above it will be seen that a trap is provided, which is simple in construction, the parts reduced to a minimum and one which is positive in its operation. Also a trap which is easily tripped by the rat or mouse.

The invention having been set forth what is claimed as new and useful is:

1. A trap comprising an elongated casing having a chamber therein and entrances at the ends thereof, a rock shaft mounted in bearings on the upper side of the casing adjacent one side thereof, the ends of the shaft being provided with arms angularly disposed and beyond the ends of the casing, closures carried by said arms and positioned to register with the entrances when the arms move downwardly, ears carried by the ends of the casing and forming means for limiting the downward movement of the closures, spring means for normally forcing said arms downwardly, a crank carried by said shaft, a supporting bracket carried by the casing, a member pivoted on the supporting bracket and extending transversely of the casing and over the crank, spaced guide fingers between which the pivoted transverse member is disposed, a transversely pivoted platform disposed within the chamber of the casing, an upwardly extending arm carried by the platform and extending through the upper side of the casing and an inwardly extending lug carried by the upwardly extending arm and adapted to engage over the free end of the transversely disposed pivoted member.

2. A trap comprising a casing having entrances at its ends, a rotatable shaft carried by the casing, closure members carried by said shaft and adapted to register with the entrances, spring means for normally forcing the closure members towards registration, a crank carried by the shaft, a transversely pivoted platform disposed within the casing, a lug carried by said platform, and a transversely disposed crank holding member extending across the crank and having its free end disposed beneath the lug of the pivoted platform.

3. The combination with a trap comprising a casing, crank controlled means for controlling the entrances to the trap, of means for releasing the crank, said means comprising a transversely pivoted platform within the trap, an upwardly and inwardly extending arm carried by the platform above its pivotal point, a pivoted member extending across the crank and having its free end disposed beneath the said upwardly and inwardly extending member, and guide and holding fingers between which the free end of the transversely disposed member is disposed.

In testimony whereof I have signed my name to this specification in the presence of two subscribing witnesses.

CHRISTIAN J. SWANK.

Witnesses:
EDWARD R. LEACH,
ROSE G. LEACH.